United States Patent
Park et al.

(10) Patent No.: US 8,355,433 B2
(45) Date of Patent: Jan. 15, 2013

(54) ENCODING VIDEO STREAMS FOR ADAPTIVE VIDEO STREAMING

(75) Inventors: Anthony Neal Park, San Jose, CA (US); Yung-Hsiao Lai, Fremont, CA (US); David Randall Ronca, Campbell, CA (US)

(73) Assignee: Netflix, Inc., Los Gatos, CA (US)

( * ) Notice: Subject to any disclaimer, the term of this patent is extended or adjusted under 35 U.S.C. 154(b) by 619 days.

(21) Appl. No.: 12/543,328

(22) Filed: Aug. 18, 2009

(65) Prior Publication Data

US 2011/0268178 A1 Nov. 3, 2011

(51) Int. Cl.
*H04N 7/12* (2006.01)
*H04L 12/66* (2006.01)

(52) U.S. Cl. .................. 375/240.02; 370/352

(58) Field of Classification Search ....... 375/240.01–29; 370/352; *H04N 7/12*
See application file for complete search history.

(56) References Cited

U.S. PATENT DOCUMENTS

| | | | |
|---|---|---|---|
| 6,453,114 B2 * | 9/2002 | Schultz et al. | 386/351 |
| 7,263,129 B2 * | 8/2007 | Kawa et al. | 375/240.25 |
| 7,818,444 B2 | 10/2010 | Brueck et al. | |
| 2003/0067872 A1 * | 4/2003 | Harrell et al. | 370/229 |
| 2005/0123274 A1 * | 6/2005 | Crinon et al. | 386/69 |
| 2008/0259799 A1 * | 10/2008 | van Beek | 370/235 |
| 2009/0083279 A1 * | 3/2009 | Hasek | 707/10 |

OTHER PUBLICATIONS

PCT Search Report, PCT Appl. No. PCT/US2010/045805, mailed Oct. 6, 2010.

* cited by examiner

*Primary Examiner* — Jay Patel
*Assistant Examiner* — Richard Torrente
(74) *Attorney, Agent, or Firm* — Patterson & Sheridan, LLP

(57) ABSTRACT

One embodiment of the invention sets forth an encoding server including components configured to encode a video stream associated with a content title for adaptive streaming. The video stream is first processed by a VC1 encoder to generate an encoded video stream comprising a multiple GOPs, each GOP including a key frame and having a different playback offset. The encoded video stream is then packaged such that the GOPs are stored in data packets of the packaged encoded stream. An SHI generator generates an SHI associated with the packaged encoded stream that includes a switch point associated with each GOP. Each switch point includes the playback offset associated with the corresponding GOP and the data packet storing the key frame of the corresponding GOP. The SHI associated with multiple packaged encoded video streams associated with the same content title and encoded to different playback bit rates have corresponding switch points.

19 Claims, 6 Drawing Sheets

| SHI 338 | | |
|---|---|---|
| Index 402 | Offset 404 | Data Packet ID 406 |
| 0 | Offset 0.000s | Data Packet 1 |
| 1 | Offset 3.000s | Data Packet 4 |
| 2 | Offset 6.000s | Data Packet 6 |
| 3 | Offset 9.000s | Data Packet 8 |

ENCODING VIDEO STREAMS FOR ADAPTIVE VIDEO STREAMING

BACKGROUND OF THE INVENTION

1. Field of the Invention

The present invention relates generally to digital media and, more specifically, to encoding video streams for adaptive video streaming.

2. Description of the Related Art

Conventional digital content distribution systems usually include a content server, a content player, and a communications network connecting the content server to the content player. The content server is configured to store digital content files corresponding to different content titles that can be downloaded from the content server to the content player. Each digital content file typically includes a video stream encoded to a particular playback bit rate as well as an audio stream. As is well-understood, a video stream encoded to a high playback bit rate is larger in size than a video stream encoded to a lower playback bit rate.

The content player is configured to download and play a digital content file corresponding to a specific content title in response to a user selecting the content title for playback. Downloading the digital content file typically involves a technique known in the art as "streaming," whereby the content server sequentially transmits the digital content file corresponding to the selected content title to the content player. The content player then plays the video stream and the audio stream included in the digital content file as portions of those streams become available. Prior to initiating the download of the digital content file, the content player may measure available bandwidth from the content server and select a digital content file having a video stream encoded to a bit rate that can be supported by the measured available bandwidth. To the extent the communications network can provide adequate bandwidth to download the selected digital content file, while satisfying bit rate requirements, playback of the downloaded digital content file proceeds satisfactorily.

In practice, however, available bandwidth in the communications network constantly changes as different devices connected to the communications network perform independent tasks. To maximize playback quality in the face of changing bandwidth availability, an adaptive streaming technique may be implemented. In adaptive streaming, if the available bandwidth in the communications network increases, then the content player downloads a different content file corresponding to the selected content title that includes a video stream encoded to a higher playback bit rate. Similarly, if the available bandwidth in the communications network decreases, then the content player may download a different content file corresponding to the selected content title that includes a video stream encoded to a lower playback bit rate.

When switching from downloading a current video stream to downloading a new video stream, the content player needs to match the video frame in the new video stream corresponding to the video frame in the current video stream being played at the time of the switch. To match video frames, the content player typically sequentially searches the new video stream to locate the video frame that matches the relevant video frame in the current video stream. One drawback to this approach is that the searching operation may be very time consuming, thereby causing an interruption in downloading the video stream that disrupts the viewing experience for the user.

As the foregoing illustrates, what is needed in the art is a video stream encoding mechanism that allows for switching between video streams that reduces the incidence of playback interruption relative to prior art techniques.

SUMMARY OF THE INVENTION

One embodiment of the present invention sets forth a method for encoding a video stream associated with a content title for adaptive video streaming. The method includes the steps of applying a video codec to the video stream at a specific playback bit rate to generate a sequence of groups of pictures (GOPs), wherein each GOP is associated with a playback time interval and a different playback offset and includes a key frame and one or more frames of video data, applying an advanced system format to the sequence of GOPs to generate one or more data packets that include the sequence of GOPs, generating a sequence header index for the sequence of GOPs that includes a first switch point corresponding to a first GOP in the sequence of GOPs, wherein the first switch point specifies the playback offset associated with the first GOP and a first data packet that includes a first key frame included in the first GOP, and combining the sequence header index with the one or more data packets to generate an encoded video stream.

One advantage of the disclosed method is that a content player can efficiently switch from one encoded video stream associated with a specific content title and having a specific playback bit rate to another encoded video stream associated with the same content title and having different playback bit rate by identifying the appropriate switch point in the sequence header index associated with the new encoded video stream.

BRIEF DESCRIPTION OF THE DRAWINGS

FIG. 4 is more detailed illustration of the sequence header index of FIG. 3, according to one embodiment of the invention;

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
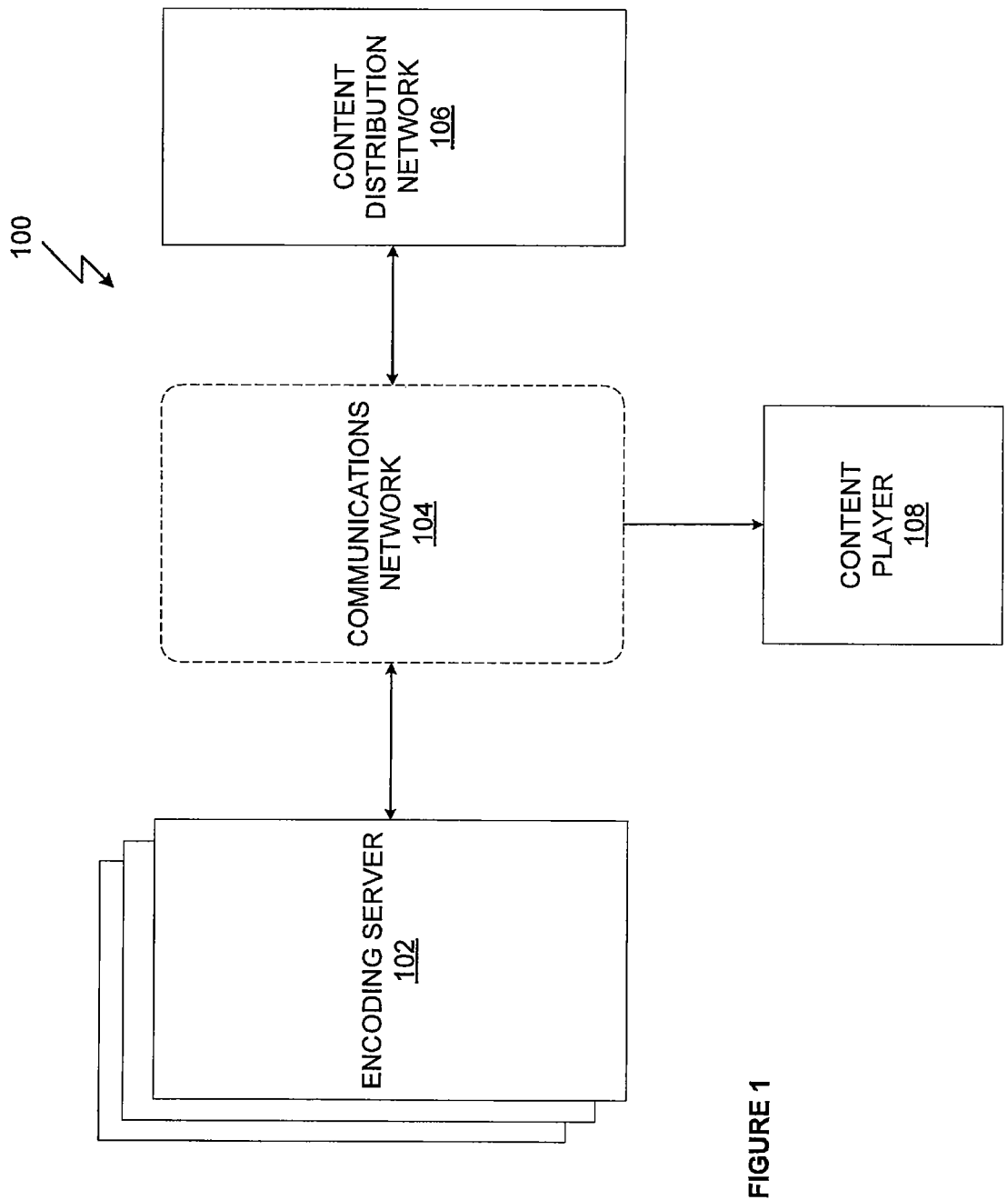
FIG. 1 illustrates a content distribution system configured to implement one or more aspects of the invention.

FIG. 1 illustrates a content distribution system 100 configured to implement one or more aspects of the invention. As shown, the content distribution system 100 includes an encoding server 102, a communications network 104, a content distribution network (CDN) 106 and a content player 108.

The communications network 104 includes a plurality of network communications systems, such as routers and switches, configured to facilitate data communication between the encoding server 102, the CDN 106 and the content player 108. Persons skilled in the art will recognize that many technically feasible techniques exist for building the communications network 104, including technologies practiced in deploying the well-known internet communications network.

The encoding server 102 is a computer system configured to encode video streams associated with digital content files for adaptive streaming. The encoding workflow for encoding the video streams for adaptive streaming is described in greater detail below with respect to FIGS. 2 and 3. The content distribution system 100 maybe include one or more encoding servers 102, where each encoding server 102 is configured to perform all the functions needed to encode the video streams or where each encoding server 102 is configured to perform a particular function needed to encode the video streams. The digital content files including the encoded video streams are retrieved by the CDN 106 via the communications network 104 for distribution to the content player 108.

The CDN 106 comprises one or more computer systems configured to serve download requests for digital content files from the content player 108. The digital content files may reside on a mass storage system accessible to the computer system. The mass storage system may include, without limitation, direct attached storage, network attached file storage, or network attached block-level storage. The digital content files may be formatted and stored on the mass storage system using any technically feasible technique. A data transfer protocol, such as the well-known hyper-text transfer protocol (HTTP), may be used to download digital content files from the content server 106 to the content player 108.

The content player 108 may comprise a computer system, a set top box, a mobile device such as a mobile phone, or any other technically feasible computing platform that has network connectivity and is coupled to or includes a display device and speaker device for presenting video frames, and generating acoustic output, respectively. The content player 108 is configured for adaptive streaming, i.e., to download units of a video stream encoded to a specific playback bit rate, and switch to downloading subsequent units of a video stream encoded to a different playback bit rate based on prevailing bandwidth conditions within the communications network 104. As available bandwidth within the communications network 104 becomes limited, the content player 108 may select a video stream encoded to a lower playback bit rate. As available bandwidth increases, a video stream encoded to a higher playback bit rate may be selected.

Although, in the above description, the content distribution system 100 is shown with one content player 108 and one CDNs 106, persons skilled in the art will recognize that the architecture of FIG. 1 contemplates only an exemplary embodiment of the invention. Other embodiments may include any number of content players 108 and/or CDNs 106. Thus, FIG. 1 is in no way intended to limit the scope of the present invention in any way.

Figure 2:
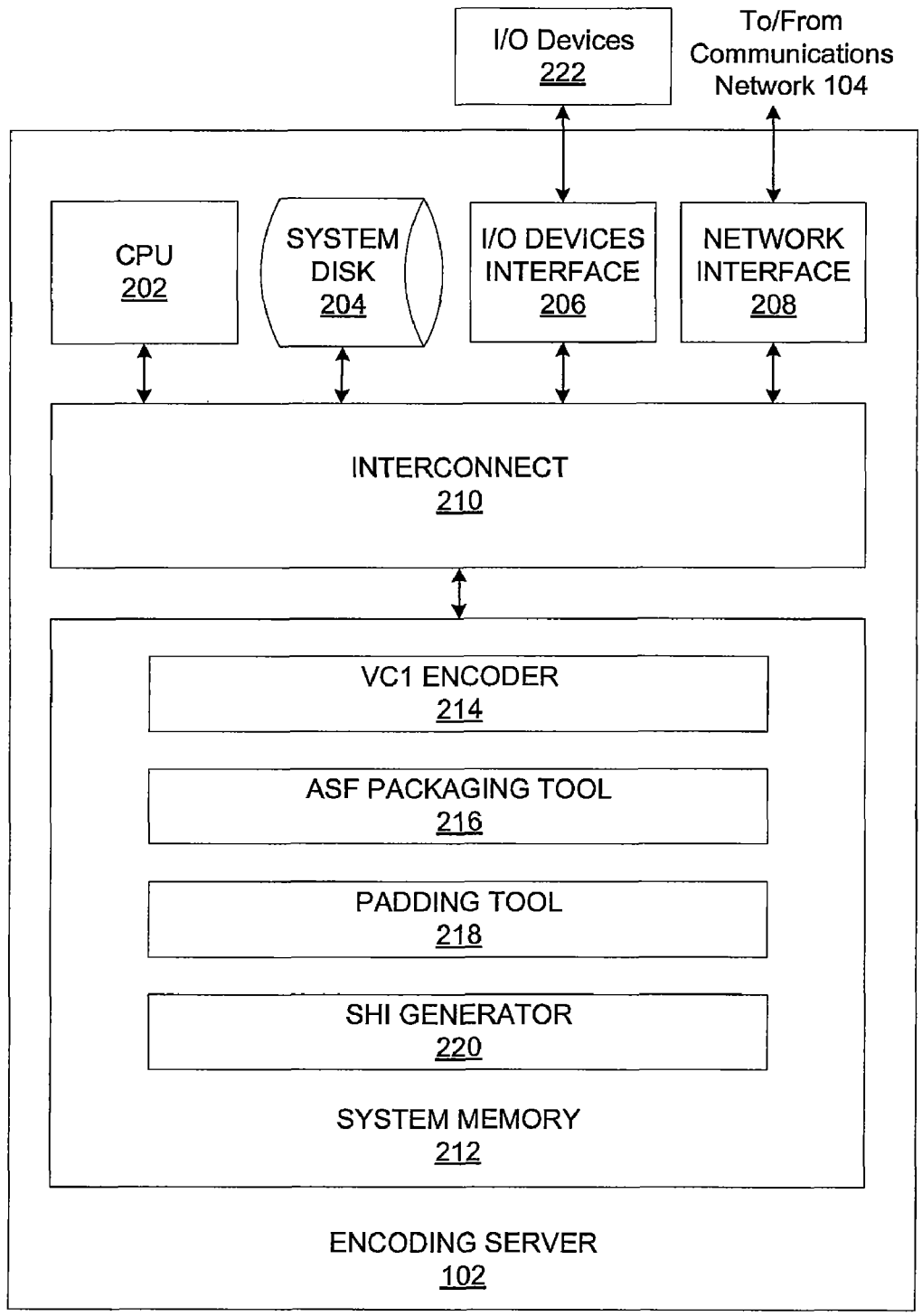
FIG. 2 is a more detailed illustration of the encoding server of FIG. 1, according to one embodiment of the invention.

FIG. 2 is a more detailed illustration of the encoding server 102 of FIG. 1, according to one embodiment of the invention. As shown, the encoding server 102 includes a central processing unit (CPU) 202, a system disk 204, an input/output (I/O) devices interface 206, a network interface 208, an interconnect 210 and a system memory 212.

The CPU 202 is configured to retrieve and execute programming instructions stored in the system memory 212. Similarly, the CPU 202 is configured to store application data and retrieve application data from the system memory 212. The interconnect 210 is configured to facilitate transmission of data, such as programming instructions and application data, between the CPU 202, the system disk 204, I/O devices interface 206, the network interface 208, and the system memory 212. The I/O devices interface 206 is configured to receive input data from I/O devices 222 and transmit the input data to the CPU 202 via the interconnect 210. For example, I/O devices 222 may comprise one or more buttons, a keyboard, and a mouse or other pointing device. The I/O devices interface 206 is also configured to receive output data from the CPU 202 via the interconnect 210 and transmit the output data to the I/O devices 222. The system disk 204, such as a hard disk drive or flash memory storage drive or the like, is configured to store non-volatile data such as encoded video streams. The encoded video streams can then be retrieved by the CDN 106 via the communications network 104. The network interface 218 is coupled to the CPU 202 via the interconnect 210 and is configured to transmit and receive packets of data via the communications network 104. In one embodiment, the network interface 208 is configured to operate in compliance with the well-known Ethernet standard.

The system memory 212 includes software components that include instructions for encoding one or more video streams associated with a specific content title for adaptive streaming. As shown, these software components include a VC1 encoder 214, an advanced systems format (ASF) packaging tool 216, a padding tool 218 and a sequence header index (SHI) generator 220.

The VC1 encoder 214 executes encoding operations for encoding a video stream to a specific playback bit rate such that the encoded video stream complies with the VC1 video codec standard and is configured for adaptive streaming. In an alternative embodiment, the video stream can be encoded to comply with a different video codec standard such as MPEG or H.264. An encoded video stream generated by the VC1 encoder 214 includes a sequence of groups of pictures (GOPs), each GOP comprising multiple frames of video data. When encoding the video stream, the VC1 encoder 214 encodes the video stream according to three settings included in the VC1 video codec standard. First, the closed entry point setting is enabled to ensure that each GOP in the encoded video stream is independent of the other GOPs in the encoded video stream. Second, the sequence header output mode setting is enabled so that a key frame that includes a sequence header is inserted at the beginning of each GOP. The sequence header included in the key frame of a GOP specifies, among other information, a sequence header start code that can be used to locate the key frame within the encoded video stream and the resolution and aspect ratio of the frames of video data in the GOP. Third, the adaptive GOP setting is disabled to ensure that each GOP is associated with the same playback time interval and a different playback offset. The playback offset associated with a GOP is determined based on the location of the GOP in the sequence of GOPs included in the encoded video stream. For example, in an encoded video stream where each GOP has a playback time interval of three seconds, a first GOP in the encoded video stream would have a playback offset of zero seconds, a second GOP in the encoded video stream would have a playback offset of three seconds and so forth. Once encoded, the VC1 encoder 214 transmits the encoded video stream to the ASF packaging tool 216 for further processing.

The ASF packaging tool 216 packages the encoded video stream received from the VC1 encoder 214 into an advanced systems format (ASF) compliant encoded video stream, which can be downloaded and processed for playback by multiple types of standards-compliant content players, including content player 108. The ASF compliant encoded video stream includes a data object and an ASF header. The data object stores the GOPs in one or more data packets of the same size. Since the size of the data packets may not match the size of the GOPs, a specific data packet may include frames of video data associated with two or more GOPs. The ASF header includes information associated with the ASF compliant encoded video stream, such as the size and the number of data packets, needed by a content player, such as the content player 108, to process the ASF compliant encoded video stream for playback.

The ASF compliant encoded video stream is then processed by the padding tool 218. The padding tool 218 inserts padding into the data object of the ASF compliant encoded video stream to ensure that the key frame associated with each GOP is located at the start of a different data packet within the data object. As described below, aligning key frames with different data packets allows the SHI generator 220 to define switch points for the ASF compliant encoded video stream, thus enabling content players to switch between multiple ASF compliant encoded video streams efficiently. The padding tool 218 then transmits the ASF compliant encoded video stream to the SHI generator 220.

The SHI generator 220 generates a sequence header index associated with the ASF compliant encoded video stream. To generate the sequence header index, the SHI generator 220 first searches the data object of the ASF compliant encoded video stream for the key frames associated with the different GOPs included in the data object. The key frames can be located by the SHI generator 220 based on the sequence start codes specified in the sequence headers included in the key frames. For the GOP associated with each of the identified key frames, the SHI generator 220 defines a switch point within the sequence header index that stores (i) a data packet number that indentifies the data packet that includes the key frame associated with the GOP and (ii) the playback offset associated with the GOP. Again, the playback offset associated with the GOP is determined based on the location of the GOP in the sequence of GOPs included in the encoded video stream.

The encoding server 102 may generate multiple ASF compliant encoded video streams associated with the same content title and encoded to different playback bit rates in the manner described above. The encoding process described herein ensures that, across the different ASF compliant encoded video streams the GOPs are associated with the same playback time interval and that corresponding GOPs across the different ASF compliant encoded video streams are associated with the same playback offsets. Therefore, each switch point defined in a sequence header included in one of the ASF compliant encoded video stream associated with a specific content title has a corresponding switch point defined in a sequence header included in each of the other ASF compliant encoded video stream associated with the same content title.

Based on the sequence header indices included in two ASF compliant encoded video streams associated with the same content title, a content player can efficiently switch between the ASF compliant encoded video streams by identifying the appropriate switch points in the sequence header indices.

When switching between a currently playing ASF compliant encoded video stream and a new ASF compliant encoded video stream, a content player, such as the content player 108, searches the sequence header index included in the new ASF compliant encoded video stream to locate the particular switch point specifying the playback offset associated with the next GOP to be played. The content player can then switch to the new ASF compliant encoded video stream and download the GOP stored in the data packet specified at the particular switch point for playback. For example, for ASF compliant encoded video streams where each GOP were associated with a playback time interval of three seconds, if the first GOP associated with the playback offset of zero seconds were currently being played, then the next GOP to be played would be associated with the playback offset of three seconds. In such a scenario, the content player searches the sequence header associated with the new encoded stream for the particular switch point specifying a playback offset of three seconds. Once locating the particular switch point, the content player would download the GOP stored in the data packet specified in the switch point for playback.

In one alternative embodiment, padding is not inserted into the data object of the encoded video stream, and therefore, the key frames of the different GOPs are not necessarily aligned with new data packets. In such an embodiment, the sequence header index specifies the data packet including a specific key frame, and the content player searches through the data packet for the key frame. Without padding, the size of the encoded video stream is reduced and, therefore, the encoded video stream can be downloaded faster by a content player.

In another alternative embodiment, the ASF packaging tool 216 ensures that the data packet size across multiple encoded video streams associated with the same content title are the same size. Because the ASF standard requires that the size of the data packets in a single encoded video stream are the same, ensuring that data packets across multiple encoded video stream have the same size allows content players to splice data packets of multiple encoded video streams into a single encoded video stream.

Figure 3:
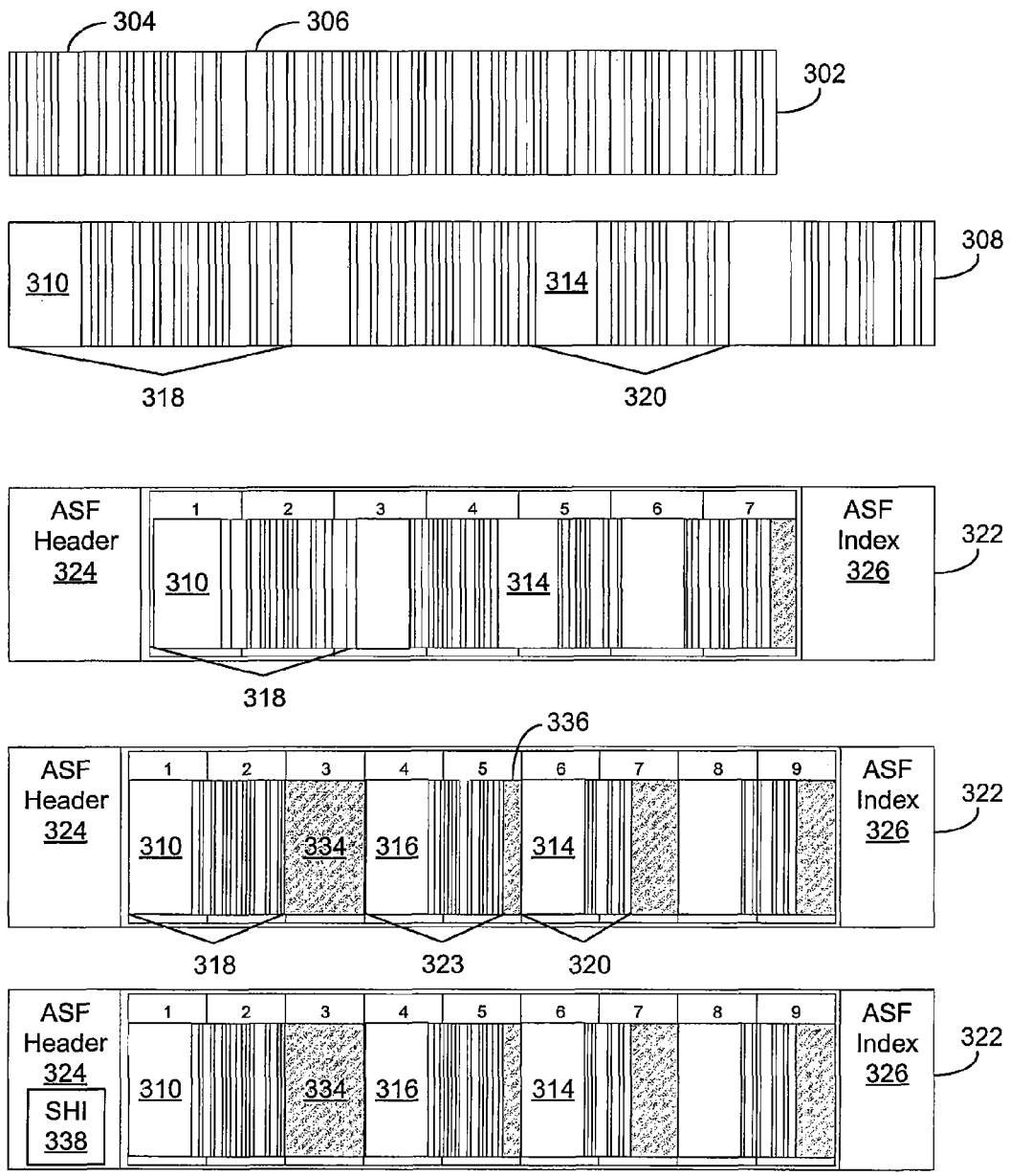
FIG. 3 is a conceptual diagram illustrating the different encoded stages of a video stream processed by the encoding server of FIG. 2, according to one embodiment of the invention.

FIG. 3 is a conceptual diagram illustrating the different encoded stages of a video stream processed by the encoding server 102 of FIG. 2, according to one embodiment of the invention. The video stream 302 is a mezzanine video stream associated with a specific content title as distributed by a video stream distributor once the rights to the specific content title are acquired. The video stream 302 comprises a series of sequential frames of video data, such as frame 304 and frame 306.

The video stream 302 is encoded by the VC1 encoder 214 to generate the encoded video stream 308. As previously described herein, the VC1 encoder 214 encodes the mezzanine video stream to a specific playback bit rate. The encoded video stream 308 is divided into multiple GOPs, such as GOP 318 and GOP 320. Each GOP includes a key frame including a sequence header, such as key frame 310 in GOP 318 and key frame 314 in GOP 320. Further, each GOP within the encoded video stream 308 is associated with the same playback time interval and a different playback offset. For example, if the playback time interval is three seconds, then GOP 318 is associated with a playback offset of zero seconds, while GOP 320 is associated with a playback offset of six seconds.

The encoded video stream 308 is then processed by the ASF packaging tool 216 to generate an ASF compliant encoded video stream 322. As shown, the ASF compliant encoded video stream 322 includes an ASF header 324, a data object including same-sized data packets, such as data packet 1 and data packet 7, and an ASF index 326. Again, the ASF header 324 includes information associated with the ASF compliant encoded video stream 322, such as the size and the number of data packets. The ASF index 326 includes index information associated with the ASF compliant encoded video stream 322, and the data packets within the data object store the GOPs. As previously described herein, because the size of the data packets does not necessarily match the size of the GOPs, one GOP may be stored across different data packets. For example, as shown, GOP 318 is stored in data packet 1, data packet 2 and partially in data packet 3.

The ASF compliant encoded video stream 322 is then processed by the padding tool 218. Again, the padding tool 218 inserts padding into the data object of the ASF compliant encoded video stream 322 to ensure that the key frame associated with each GOP is located at the start of a different data packet within the data object. For example, the padding tool 218 inserts padding 334 into data packet 3 after GOP 318 such that the key frame 316 of GOP 323 is aligned with a new data packet, i.e., data packet 4. Similarly, the padding tool 218 inserts padding 336 into data packet 5 after GOP 323 such that key frame 314 of GOP 320 is aligned with a new data packet, i.e., data packet 6.

Once the data object of the ASF compliant encoded video stream 322 is padded, the SHI generator 220 generates a sequence header index 338 associated with the ASF compliant encoded video stream 322. For the GOP associated with each of the identified key frames, the SHI generator 220 defines a switch point within the sequence header index 338 that stores (i) a data packet number that indentifies the data packet that includes the key frame associated with the GOP and (ii) the playback offset associated with the GOP. The sequence header index 338 is described in greater detail below in conjunction with FIG. 4. Once generated, the SHI generator 220 inserts the sequence header index 338 into the ASF header 324 of the ASF compliant encoded video stream 322.

FIG. 4 is more detailed illustration of the sequence header index of FIG. 3, according to one embodiment of the invention. As shown, the sequence header index includes one or more switch points, such as switch point 408 and switch point 410, and each switch point includes an index portion 402, an offset portion 404, and a data packet portion 406. Each switch point is associated with a specific GOP starting at a particular playback offset specified in the offset portion 404 of the switch point, where the key frame of that GOP is located within a particular data packet specified in the data packet portion 406 of the switch point. For example, switch point 408 is associated with GOP 318, and the offset portion 404 of the switch point 408 indicates that the playback offset for the GOP 318 is zero seconds (i.e., the first GOP in the video stream) and the data packet portion 406 indicates that the key frame 310 of GOP 318 is located in data packet 1.

Figure 5:
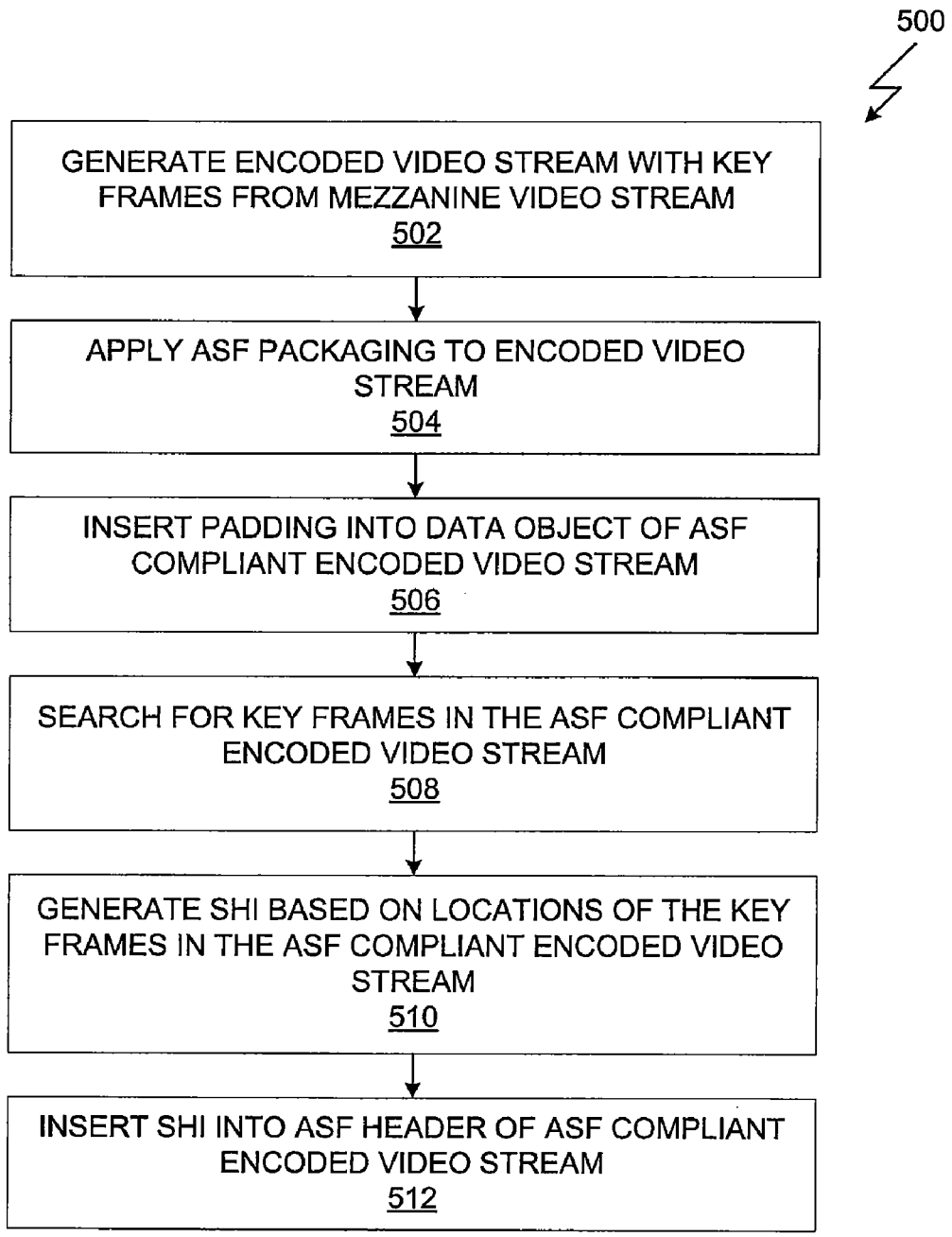
FIG. 5 is a flow diagram of method steps for encoding a video stream for adaptive video streaming, according to one embodiment of the invention.

FIG. 5 is a flow diagram of method steps for encoding a video stream for adaptive video streaming, according to one embodiment of the invention. Although the method steps are described in conjunction with the systems for FIGS. 1-4, persons skilled in the art will understand that any system configured to perform the method steps, in any order, is within the scope of the invention.

The method 500 begins at step 502 where the VC1 encoder 214 executes encoding operations on a mezzanine video stream to generate an encoded video stream encoded to a specific play back bit rate. An encoded video stream generated by the VC1 encoder 214 includes a sequence of groups of pictures (GOPs), each GOP comprising multiple frames of video data and a key frame that includes a sequence header. Each GOP is associated with the same playback time interval and a different playback offset. Again, the playback offset associated with a GOP is determined based on the location of the GOP in the sequence of GOPs included in the encoded video stream.

At step 504, the ASF packaging tool 216 processes the encoded video stream to generate an ASF compliant encoded video stream. As previously described herein, the ASF compliant encoded video stream includes an ASF header, a data object including same-sized data packets and, optionally, an ASF index. The ASF header and ASF index store information related to the ASF compliant encoded video stream such as the size of the data packets and the indices of the data packets. The data object stores the GOPs of the encoded video stream in the data packets.

At step 506, the padding tool 218 inserts padding into the data object of the ASF compliant encoded video stream to ensure that the key frame associated with each GOP is located at the start of a different data packet within the data object. The padding tool 218 then transmits the ASF compliant encoded video stream to the SHI generator 220.

At step 508, the SHI generator 220 searches the data object of the ASF compliant encoded video stream for the key frames associated with the different GOPs included in the data object. The key frames can be located by the SHI generator 220 based on the sequence start codes specified in the sequence headers included in the key frames. At step 510, the SHI generator 220 generates a sequence header index associated with the ASF compliant encoded video stream based on the locations of the key frames. For the GOP associated with each of the identified key frames, the SHI generator 220 defines a switch point within a sequence header index that stores (i) a data packet number that indentifies the data packet that includes the key frame associated with the GOP and (ii) the playback offset associated with the GOP. At step 512, the SHI generator 220 inserts the sequence header index into the ASF header of the ASF compliant encoded video stream.

In an alternative embodiment, a video stream being processed by the encoding server 102 may be encrypted using a digital rights management (DRM) encryption technique during the encoding process. In DRM implementations, because the sequence header start codes identifying the key frames of the GOPs in an encoded video stream are also encrypted, if the technique described above were employed, the SHI generator 220 would end up searching for the key frames based on the sequence header start codes post-encryption and, thus, not be able to generate a sequence header index associated with the encoded video stream. To address this nuance of DRM implementations, the technique described below in conjunction with FIG. 6 can be used as an alternative to the technique described above.

Figure 6:
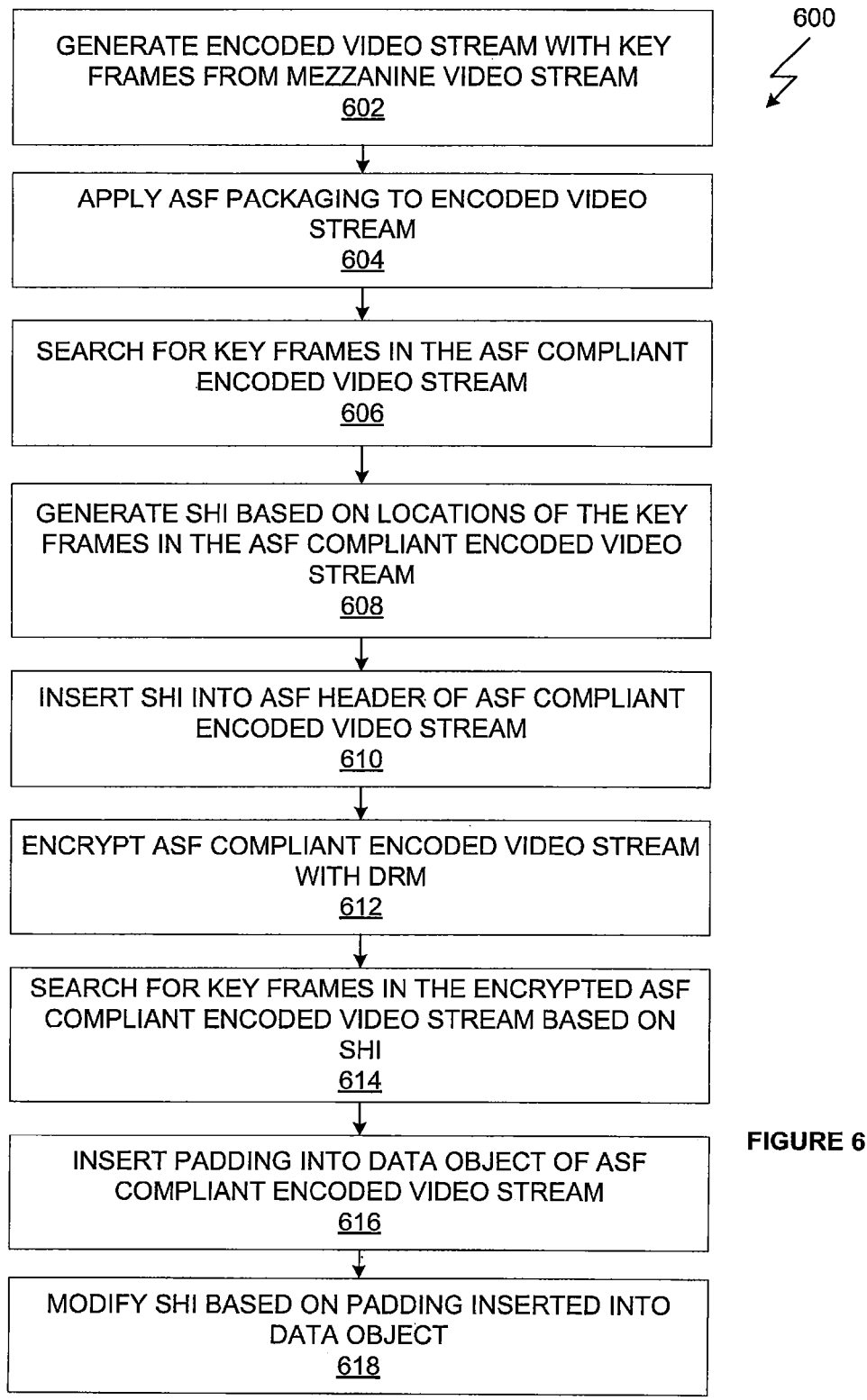
FIG. 6 is a flow diagram of method steps for encoding and encrypting a video stream for adaptive video streaming, according to another embodiment of the invention.

FIG. 6 is a flow diagram of method steps for encoding and encrypting a video stream for adaptive video streaming, according to another embodiment of the invention. Although the method steps are described in conjunction with the systems for FIGS. 1-4, persons skilled in the art will understand that any system configured to perform the method steps, in any order, is within the scope of the invention.

The method 600 begins at step 602, where the VC1 encoder 214 executes encoding operations on a mezzanine video stream to generate an encoded video stream encoded to a specific play back bit rate. An encoded video stream generated by the VC1 encoder 214 includes a sequence of groups of pictures (GOPs), each GOP comprising multiple frames of video data and a key frame that includes a sequence header. Each GOP is associated with the same playback time interval and a different playback offset.

At step 604, the ASF packaging tool 216 processes the encoded video stream to generate an ASF compliant encoded video stream. As previously described herein, the ASF compliant encoded video stream includes an ASF header, a data object including same-sized data packets and, optionally, an ASF index. The data object stores the GOPs of the encoded video stream in the data packets.

At step 606, the SHI generator 220 searches the data object of the ASF compliant encoded video stream for the key frames associated with the different GOPs included in the data object. The key frames can be located by the SHI generator 220 based on the sequence start codes specified in the sequence headers included in the key frames. At step 608, the SHI generator 220 generates a sequence header index associated with the ASF compliant encoded video stream based on the locations of the key frames. For the GOP associated with each of the identified key frames, the SHI generator 220 defines a switch point within a sequence header index that stores (i) a data packet number that indentifies the data packet that includes the key frame associated with the GOP and (ii) the playback offset associated with the GOP. At step 610, the SHI generator 220 inserts the sequence header index into the ASF header of the ASF compliant encoded video stream.

At step 612, the encoding server 102 encrypts the ASF compliant encoded video stream using a DRM encryption technique, such as PlayReady DRM or Windows Media DRM (WMDRM). As is well-known, encrypting a video stream using a DRM encryption technique may change the size of the frames of video data stored in the each GOP. Thus, the locations of the key frames within the ASF compliant encoded video stream may change post-encryption.

At step 614, the SHI generator 220 locates each key frame in the ASF compliant encoded video stream based on the corresponding playback offset stored in the sequence header index. Again, during encryption, the location of a key frame may change, but the playback offset associated with the GOP including the key frame does not change, thereby allowing the SHI generator 220 to locate accurately the key frame based on the playback offset.

At step 616, the padding tool 218 inserts padding into the data object of the ASF compliant encoded video stream to ensure that the key frame associated with each GOP is located at the start of a different data packet within the data object. At step 616, the SHI generator 220 modifies the sequence header index stored in the ASF header of the ASF compliant encoded video stream based on the padding inserted into the data object of the encrypted ASF compliant encoded video stream. Specifically, the SHI generator 220 modifies the data packet identifiers stored in the sequence header index to specify the data packet storing the key frame.

In this fashion, the SHI generator 220 is able to generate the sequence header index associated with the ASF compliant encoded video stream before DRM encryption. Because the playback offsets associated with the GOPs remain the same during encryption, the SHI generator 220 is able to modify the sequence header index based on the new locations of the key frames included in the GOPs post-encryption. As a result, a content player can efficiently switch between encrypted ASF compliant encoded video streams associated with the same content title by identifying the appropriate switch points in the sequence header indices included in encrypted ASF compliant encoded video streams.

In another alternative embodiment, when encrypting a video stream using WMDRM encryption, the encoding technique set forth in FIG. 5 may be implemented. Once the sequence header index associated with the ASF compliant encoded video stream is generated, the ASF compliant encoded video stream can be encrypted using WMDRM encryption. Because the WMDRM encryption technique does not change the locations of the key frames in the encrypted video stream, the sequence header index does not need to be re-adjusted after WMDRM encryption. As persons skilled in the art will recognize, the technique of FIG. 6 may also be used in WMDRM implementations.

In sum, an encoding server encodes a video stream associated with a content title to identify switch points that are specified in a sequence header index included in the encoded video stream. The switch points of two or more video streams corresponding to the same content title and encoded to different playback bit rates occur at the same playback time intervals across each of the two or more video streams.

When encoding a particular video stream, the VC1 encoder within the encoding server first processes the video stream to generate an encoded video stream that is divided into one or more groups of pictures (GOPs) of video data. Each GOP includes a sequence header followed by multiple frames of video data. The sequence header specifies the resolution and the aspect ratio of the frames of video data, and the frames of video data within the GOP are associated with a particular playback time interval starting at a specific playback offset.

Once the encoded video stream is generated, the ASF packaging tool within the encoding server packages the encoded video stream into an ASF compliant encoded video stream. The ASF compliant encoded video stream includes an ASF header and a data object. The ASF header includes information associated with the encoded video stream, such as the size and the number of data packets, needed by a content player to process the encoded video stream for playback. The data object stores the GOPs in one or more data packets.

The ASF packaging tool transmits the ASF compliant encoded video stream to the padding tool within the encoding server. The padding tool inserts padding into the data object of the ASF compliant encoded video stream to align the sequence header of each GOP with a new data packet within the data object. Once the padding is inserted into the data object, the sequence header index (SHI) generator within the encoding server generates an SHI associated with the ASF compliant encoded video stream. For each GOP in the ASF compliant encoded video stream, the SHI specifies the data packet including the sequence header of the GOP and the playback offset corresponding to the GOP. The SHI generator then inserts the SHI into the ASF header of the ASF compliant encoded video stream.

When encoding two or more video streams associated with the same content title, encoding server 102 generates two or more ASF compliant encoded video streams encoded to different playback bit rates in the manner described above. Importantly, across the two or more ASF compliant encoded video streams, corresponding GOPs are associated with the same time interval and the same playback offsets. Therefore, each switch point defined in a sequence header included in one ASF compliant encoded video stream associated with a specific content title has a corresponding switch point defined in a sequence header included in a different ASF compliant encoded video stream associated with the same content title.

One advantage of the disclosed technique is that a content player can efficiently switch from one encoded video stream associated with a specific content title and having a specific playback bit rate to another encoded video stream associated with the same content title and having different playback bit rate by identifying the appropriate switch point in the sequence header index associated with the new encoded video stream. Because the content player does not have to search for the appropriate frame of video data included in the encoded video stream for playback, the incidence of playback interruption when switching between encoded video streams is reduced. Another advantage of the disclosed technique is that the encoded video streams generated by the encoding server are ASF compliant and, therefore, can be downloaded and processed for playback by any standards-compliant content player.

While the foregoing is directed to embodiments of the present invention, other and further embodiments of the present invention may be devised without departing from the basic scope thereof. For example, aspects of the present invention may be implemented in hardware or software or in a combination of hardware and software. One embodiment of the present invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

What is claimed is:

1. A computer-implemented method for encoding a video stream associated with a content title for adaptive video streaming, the method comprising:
    applying a video codec to the video stream at a specific playback bit rate to generate a sequence of groups of pictures (GOPs), wherein each GOP is associated with a playback time interval and a different playback offset and includes a key frame and one or more frames of video data;
    applying an advanced system format to the sequence of GOPs to generate one or more data packets that include the sequence of GOPs;
    generating a sequence header index for the sequence of GOPs that includes a first switch point corresponding to a first GOP in the sequence of GOPs, wherein the first switch point specifies the playback offset associated with the first GOP and a first data packet that includes a first key frame included in the first GOP; and
    combining the sequence header index with the one or more data packets to generate an encoded video stream, wherein the sequence header index causes a content player currently playing the encoded video stream to identify the first switch point as an appropriate switching point and request the first data packet specified by the first switch point for playback.

2. The method of claim 1, wherein the first key frame includes a sequence header start code and a sequence header that stores information associated with the first GOP.

3. The method of claim 2, wherein the step of generating the sequence header index comprises searching the one or more data packets for the sequence header start code included in the first key frame to identify the first data packet.

4. The method of claim 1, further comprising the step of padding the one or more data packets to align each key frame included in the sequence of GOPs with a different data packet.

5. The method of claim 1, further comprising the step of encrypting the one or more data packets based on a digital rights management (DRM) encryption technique to generate one or more encrypted data packets.

6. The method of claim 5, wherein the DRM encryption technique comprises a Windows Media DRM encryption technique.

7. The method of claim 5, further comprising the steps of:
    based on the playback offset specified in the first switch point, determining that a first encrypted data packet stores the first key frame, wherein the first data packet and the first encrypted data packet are different data packets; and
    modifying the first switch point included in the sequence header index to specify that the first encrypted data packet stores the first key frame.

8. The method of claim 7, further comprising the step of padding the one or more encrypted data packets to align each key frame included in the sequence of GOPs with a different data packet.

9. The method of claim 1, further comprising the steps of:
    applying the video codec to a second video stream at a second playback bit rate to generate a second sequence of groups of pictures (GOPs), wherein each GOP is associated with the playback time interval and a different playback offset and includes a key frame and one or more frames of video data;
    applying the advanced system format to the second sequence of GOPs to generate one or more other data packets that include the second sequence of GOPs;
    generating a second sequence header index for the second sequence of GOPs that includes a second switch point corresponding to a second GOP in the second sequence of GOPs, wherein the second switch point specifies the playback offset associated with the second GOP and a second data packet included in the one or more other data packets, and wherein the second data packet includes a second key frame included in the second GOP; and
    combining the second sequence header index with the one or more other data packets to generate a second encoded video stream,
    wherein the playback offset associated with the second GOP is equal to the playback offset associated with the first GOP, and wherein the second switch point corresponds to the first switch point.

10. A non-transitory computer-readable medium for storing instructions that, when executed by a processor, cause the processor to encode a video stream associated with a content title for adaptive video streaming, by performing the steps of:
    applying a video codec to the video stream at a specific playback bit rate to generate a sequence of groups of pictures (GOPs), wherein each GOP is associated with a playback time interval and a different playback offset and includes a key frame and one or more frames of video data;
    applying an advanced system format to the sequence of GOPs to generate one or more data packets that include the sequence of GOPs;
    generating a sequence header index for the sequence of GOPs that includes a first switch point corresponding to a first GOP in the sequence of GOPs, wherein the first switch point specifies the playback offset associated with the first GOP and a first data packet that includes a first key frame included in the first GOP; and combining the sequence header index with the one or more data packets to generate an encoded video stream, wherein the sequence header index causes a content player currently playing the encoded video stream to identify the first switch point as an appropriate switching point and request the first data packet specified by the first switch point for playback.

11. The computer-readable medium of claim 10, wherein the first key frame includes a sequence header start code and a sequence header that stores information associated with the first GOP.

12. The computer-readable medium of claim 11, wherein the step of generating the sequence header index comprises searching the one or more data packets for the sequence header start code included in the first key frame to identify the first data packet.

13. The computer-readable medium of claim 10, further comprising the step of padding the one or more data packets to align each key frame included in the sequence of GOPs with a different data packet.

14. The computer-readable medium of claim 10, further comprising the step of encrypting the one or more data packets based on a digital rights management (DRM) encryption technique to generate one or more encrypted data packets.

15. The computer-readable medium of claim 14, wherein the DRM encryption technique comprises a Windows Media DRM encryption technique.

16. The computer-readable medium of claim 14, further comprising the steps of:
based on the playback offset specified in the first switch point, determining that a first encrypted data packet stores the first key frame, wherein the first data packet and the first encrypted data packet are different data packets; and
modifying the first switch point included in the sequence header index to specify that the first encrypted data packet stores the first key frame.

17. The computer-readable medium of claim 16, further comprising the step of padding the one or more encrypted data packets to align each key frame included in the sequence of GOPs with a different data packet.

18. The computer-readable medium of claim 10, further comprising the steps of:
applying the video codec to a second video stream at a second playback bit rate to generate a second sequence of groups of pictures (GOPs), wherein each GOP is associated with the playback time interval and a different playback offset and includes a key frame and one or more frames of video data;
applying the advanced system format to the second sequence of GOPs to generate one or more other data packets that include the second sequence of GOPs;
generating a second sequence header index for the second sequence of GOPs that includes a second switch point corresponding to a second GOP in the second sequence of GOPs, wherein the second switch point specifies the playback offset associated with the second GOP and a second data packet included in the one or more other data packets, and wherein the second data packet includes a second key frame included in the second GOP; and
combining the second sequence header index with the one or more other data packets to generate a second encoded video stream,
wherein the playback offset associated with the second GOP is equal to the playback offset associated with the first GOP, and wherein the second switch point corresponds to the first switch point.

19. A computer system, comprising:
a processor; and
a memory storing instructions that when executed by the processor are configured to:
apply a video codec to a video stream at a specific playback bit rate to generate a sequence of groups of pictures (GOPs), wherein each GOP is associated with a playback time interval and a different playback offset and includes a key frame and one or more frames of video data,
apply an advanced system format to the sequence of GOPs to generate one or more data packets that include the sequence of GOPs,
generate a sequence header index for the sequence of GOPs that includes a first switch point corresponding to a first GOP in the sequence of GOPs, wherein the first switch point specifies the playback offset associated with the first GOP and a first data packet that includes a first key frame included in the first GOP, and
combine the sequence header index with the one or more data packets to generate an encoded video stream, wherein the sequence header index causes a content player currently playing the encoded video stream to identify the first switch point as an appropriate switching point and request the first data packet specified by the first switch point for playback.

* * * * *